US010535444B2

(12) United States Patent
Chiang et al.

(10) Patent No.: US 10,535,444 B2
(45) Date of Patent: Jan. 14, 2020

(54) COMPOSITE CARBON MATERIAL AND METHOD OF PREPARING THE SAME

(71) Applicant: National Taiwan University of Science and Technology, Taipei (TW)

(72) Inventors: Wei-Hung Chiang, Taipei (TW); Yen-Sheng Li, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 100 days.

(21) Appl. No.: 14/964,585

(22) Filed: Dec. 10, 2015

(65) Prior Publication Data

US 2016/0351287 A1 Dec. 1, 2016

(30) Foreign Application Priority Data

May 29, 2015 (TW) ............................ 104117456 A

(51) Int. Cl.
*H01B 1/04* (2006.01)
*B82Y 30/00* (2011.01)
*H01B 1/08* (2006.01)

(52) U.S. Cl.
CPC ..................................... *H01B 1/08* (2013.01)

(58) Field of Classification Search
CPC ... H01B 1/04; H01B 1/24; H01B 1/08; B82Y 30/00
USPC .................. 252/502, 506, 500; 977/742, 750
See application file for complete search history.

(56) References Cited

U.S. PATENT DOCUMENTS 8,501,318 B2 8/2013 Jang et al.
2010/0055458 A1* 3/2010 Jang ....................... B82Y 30/00 428/402
2013/0199605 A1 8/2013 Huang et al.
2015/0111449 A1* 4/2015 Cruz-Silva ............... C09D 7/70 442/153
2015/0129809 A1* 5/2015 Gauthy ...................... C08J 3/02 252/511
2015/0218003 A1* 8/2015 Zhamu ................ C01B 31/0476 428/220
2015/0280248 A1* 10/2015 Tour .................... H01M 4/9083 502/180

FOREIGN PATENT DOCUMENTS

CN 102166844 A * 8/2011 ............... B32B 9/00
CN 102417176 A * 4/2012 ............ B82Y 40/00
CN 103794379 5/2014
CN 103794379 A * 5/2014 ............ C01B 31/02
(Continued)

OTHER PUBLICATIONS

"Office Action of Taiwan Counterpart Application", dated Jun. 27, 2016, p. 1-p. 8.
(Continued)

*Primary Examiner* — Tri V Nguyen
(74) *Attorney, Agent, or Firm* — JCIPRNET

(57) ABSTRACT

Provided is a composite carbon material including a substrate and a graphene oxide. The graphene oxide accounts for about 5 wt % to 60 wt % based on a total weight of the substrate and the graphene oxide. A method of preparing a composite carbon material is further provided. The prepared composite carbon material has excellent hydrophilic property, flexibility, electrical conductivity and dispersity.

4 Claims, 6 Drawing Sheets

(56) References Cited

FOREIGN PATENT DOCUMENTS

| | | | | |
|---|---|---|---|---|
| CN | 104370279 | | 2/2015 | |
| CN | 104401977 | | 3/2015 | |
| CN | 104495794 | | 4/2015 | |
| CN | 104617977 A | * | 5/2015 | ............ C01B 31/02 |
| CN | 104627977 | | 5/2015 | |
| TW | 472483 | | 1/2002 | |
| TW | I436942 | | 5/2014 | |
| TW | I466140 | | 12/2014 | |

OTHER PUBLICATIONS

Hanlin Kuo, "Preparation and characterization of conductive graphene films", Abstract of Thesis of Master Degree, Department of Chemical and Materials Engineering, National Yunlin University of Science and Technology (Taiwan) 2012, pp. 1-2.

Li et al., "Facile fabrication of flexible and surfactant-free conductive paper using carbon nanotube-graphene nanoribbon composites", Poster of TwICHE 2014, Dec. 12-14, 2014 Taoyuan, Taiwan, pp. 1-2.

* cited by examiner

Comparative Example 1

Example 1

COMPOSITE CARBON MATERIAL AND METHOD OF PREPARING THE SAME

CROSS-REFERENCE TO RELATED APPLICATION

This application claims the priority benefit of Taiwan patent application serial no. 104117456, filed on May 29, 2015. The entirety of the above-mentioned patent application is hereby incorporated by reference herein and made a part of the specification.

BACKGROUND OF THE INVENTION

Field of the Invention

The invention relates to a composite material and a method of preparing the same, and more particularly relates to a composite carbon material and a method of preparing the same.

Description of Related Art

Current flexible electronic components or wearable electronic components require transparent and flexible electrodes. However, the existing indium tin oxide (ITO) has poor dispersity due to a hydrophobic nature. Thus, conductive components made by ITO have poor flexibility and break easily, resulting in poor electrical conductivity.

Furthermore, conventional conductive carbon materials are hydrophobic and unable to be effectively dispersed, and thus, addition of a surfactant or a solvent is required to increase the dispersity. However, such surfactant or solvent is usually non-conductive, resulting in a decrease in electrical conductivity of the original carbon materials. When being applied, the surfactant or solvent is required to be further purified, which not only results in complicated steps but is also very environmentally unfriendly.

SUMMARY OF THE INVENTION

Accordingly, the invention provides a composite carbon material and a method of preparing the same, wherein a graphene oxide replaces a conventional surfactant to achieve effective dispersion and facilitate electrical conductive function.

The invention provides a composite carbon material including a substrate and a graphene oxide. The graphene oxide accounts for about 5 wt % to 60 wt % based on a total weight of the substrate and the graphene oxide.

In an embodiment of the invention, the substrate includes an oxidized, doped or undoped carbon nanotube, a doped or undoped graphite, a doped or undoped graphene, a molybdenum dioxide, or a combination thereof, a doping element includes sulfur, phosphorus, boron, nitrogen or a combination thereof In an embodiment of the invention, the substrate includes a one-dimensional conductor, a two-dimensional conductor, a three-dimensional conductor, or a combination thereof In an embodiment of the invention, the graphene oxide includes a graphene oxide having a one-dimensional conducting direction, a graphene oxide having a two-dimensional conducting direction, or a combination thereof.

In an embodiment of the invention, the composite carbon material is a flexible composite material having a conductive network structure.

The invention also provides a method of preparing a composite carbon material. A substrate and a graphene oxide are uniformly mixed in a solvent, wherein the graphene oxide accounts for about 5 wt % to 60 wt % based on a total weight of the substrate and the graphene oxide. Next, the solvent is removed.

In an embodiment of the invention, the step of removing the solvent includes performing a suction filtration, a natural drying, or a baking.

In an embodiment of the invention, the step of uniformly mixing the substrate and the graphene oxide in the solvent does not require addition of a surfactant.

In an embodiment of the invention, a method of preparing the graphene oxide includes: embedding a nitrate, a sulfate, or a combination thereof between layers of a carbon material or between adjacent carbon materials, and adding an oxidizing agent to oxidize the carbon material.

In an embodiment of the invention, the substrate includes an oxidized, doped or undoped carbon nanotube, a doped or undoped graphite, a doped or undoped graphene, a molybdenum dioxide, or a combination thereof, a doping element includes sulfur, phosphorus, boron, nitrogen or a combination thereof.

In view of the above, in the invention, a graphene oxide instead of a conventional surfactant is added into a substrate. The graphene oxide is rich in oxygen-containing functional groups, has excellent dispersion property, and forms a dense conductive network with the substrate. The graphene oxide of the invention not only facilitates dispersion of the carbon-containing substrate, but the graphene oxide itself also has electrical conductive property and can be used without requiring further purification. Therefore, the composite carbon material including the substrate and the graphene oxide has better electrical conductivity and dispersity than those of the original substrate.

To make the above and other features and advantages of the invention more comprehensible, embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

FIGS. 3(*b*), 3(*d*) and 3(*f*) are images of a conductive thin film of Example 1 of the invention, wherein the scale bar of FIG. 3(*d*) is 100 μm, and the scale bar of FIG. 3(*f*) is 500 μm.

FIG. 4(*b*) is a resistance value distribution of a conductive thin film of Example 1 of the invention.

DESCRIPTION OF THE EMBODIMENTS

The invention provides a simple method of preparing a composite carbon material, and the prepared composite carbon material has excellent hydrophilic property, flexibility, electrical conductivity and dispersity.

Herein, although materials have spatial three-dimensional structures, based on conducting directions thereof, the materials can be divided into "one-dimensional conductors (1-D conductors)", "two-dimensional conductors (2-D conductors)", and "three-dimensional conductors (3-D conductors) ". When the material is conductive only in a particular direction, namely, the conducting direction thereof is one-dimensional, such material is called a "one-dimensional conductor". When the material is conductive only in a particular plane, namely, the conducting direction thereof is two-dimensional, such material is called a "two-dimensional conductor". When the conducting direction thereof is three-dimensional, such material is called a "three-dimensional conductor".

Figure 1:
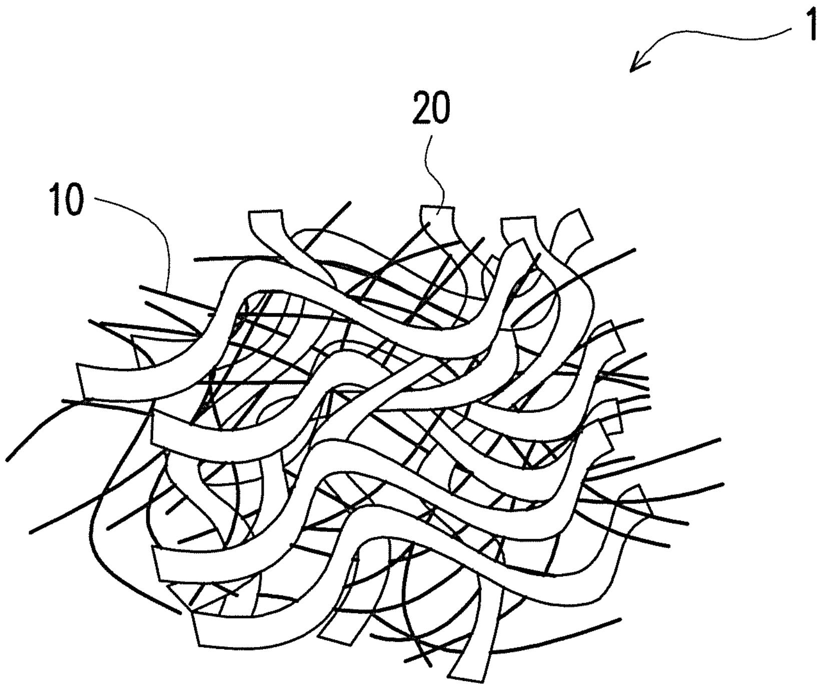
FIG. 1 is a perspective schematic diagram of a composite carbon material according to an embodiment of the invention.

FIG. 1 is a perspective schematic diagram of a composite carbon material according to an embodiment of the invention.

As shown in FIG. 1, the composite carbon material 1 of the invention includes a substrate 10 and a graphene oxide 20. In an embodiment, the substrate 10 includes an oxidized, doped or undoped carbon nanotube, a doped or undoped graphite, a doped or undoped graphene, a molybdenum dioxide, or a combination thereof. The doping element for doping the substrate includes sulfur, phosphorus, boron, nitrogen or a combination thereof. The material of the substrate 10 can also be categorized based on the dimension of the conducting direction/dimension thereof. More specifically, the substrate 10 includes a one-dimensional conductor, a two-dimensional conductor, a three-dimensional conductor, or a combination thereof, and the respective shapes and types are as shown in Table 1, but the invention is not limited thereto.

TABLE 1

Types of substrate

| Substrate | Shape | Type |
|---|---|---|
| 1-D conductor | strip | oxidized, doped or undoped single-walled carbon nanotube, oxidized, doped or undoped double-walled carbon nanotube, oxidized, doped or undoped multi-walled carbon nanotube or a combination thereof, doped or undoped graphene nanoribbon or a combination thereof |
| 2-D conductor | sheet | doped or undoped graphene, molybdenum dioxide, or a combination thereof |
| 3-D conductor | laminate | doped or undoped graphite |

The conducting direction of the graphene oxide 20 can be one-dimensional or two-dimensional. Herein, a graphene oxide having a one-dimensional conducting direction is referred to as a "one-dimensional graphene oxide (1-D graphene oxide)," and a graphene oxide having a two-dimensional conducting direction is referred to as a "two-dimensional graphene oxide (2-D graphene oxide)". In an embodiment, the graphene oxide 20 includes a one-dimensional graphene oxide, a two-dimensional graphene oxide, or a combination thereof In the graphene oxide 20, based on the total number of atoms of carbon and oxygen, carbon accounts for about 0.1 at % to 99.9 at % , such as 5 at % to 40 at %, 5 at % to 30 at %, 5 at % to 20 at % or 5 at % to 15 at %. In an embodiment, the content of oxygen of the graphene oxide 20 is about 5 at %, 10 at %, 15 at %, 20 at %, 25 at %, 30at %, 35 at %, 40 at %, or any numerical value between any two endpoints above. With an increase in the content of oxygen, the resistance value of the graphene oxide is increased, but the dispersity is improved.

The composite carbon material 1 of the invention is a flexible composite material having a conductive network structure. As shown in FIG. 1, the substrate 10 and the graphene oxide 20 are interconnected and/or entangled to form a network structure and/or a web structure. In an embodiment, the substrate 10 and the graphene oxide 20 are physically mixed without chemical bonding between each other.

It is noted that, the invention mixes the substrate 10 and the graphene oxide 20 in a specific proportion, such that the mixed and/or entangled composite carbon material 1 has excellent properties. More specifically, based on the total weight of the substrate 10 and the graphene oxide 20, the graphene oxide 20 accounts for about 5 wt % to 60 wt %, 5 wt % to 40 wt %, 5 wt % to 30 wt % or 5 wt % to 20 wt %. In an embodiment, in the composite carbon material 1, the graphene oxide 20 accounts for about 5 wt %, 10 wt %, 15 wt %, 20 wt %, 25 wt %, 30 wt %, 35 wt %, 40 wt %, 45 wt %, 50 wt %, 55 wt % or 60 wt %, or any numerical value between any two endpoints above. When the content of the graphene oxide 20 is too low, the dispersity and flexibility of the composite carbon material 1 are decreased. When the content of the graphene oxide 20 is too high, the electrical conductivity and hydrophilic property of the composite carbon material 1 are decreased. Therefore, mixing the substrate 10 and the graphene oxide 20 in a specific proportion enables the mixed and/or entangled composite carbon material 1 to have excellent hydrophilic property, flexibility, electrical conductivity and dispersity, thereby achieving the unexpected effects. The composite carbon material 1 of the invention can be applied to conductive composite materials, flexible conductive materials, thermally conductive materials, etc.

The substrate 10 and the graphene oxide 20 of the invention can be uniformly dispersed/mixed because the surface of the graphene oxide is rich in oxygen-containing functional groups, and thus, the dispersing/mixing step is performed in a solution without additional complicated process steps of purification. In an embodiment, when using a one-dimensional graphene oxide such as a graphene oxide nanoribbon (GONR), the GONR and a carbon substrate form a uniform conductive network, enabling conductivity to significantly increase.

Furthermore, regarding the dimension of the conducting direction, there are at least 18 combinations of the composite carbon material of the invention, as shown below in Table 2, but the invention is not limited thereto.

TABLE 2

Combinations of composite carbon material

| Composite carbon material | Substrate | Graphene oxide |
|---|---|---|
| Combination 1 | 1-D conductor | 1-D graphene oxide |
| Combination 2 | 1-D conductor | 2-D graphene oxide |

TABLE 2-continued

| Combinations of composite carbon material | | |
|---|---|---|
| Composite carbon material | Substrate | Graphene oxide |
| Combination 3 | 2-D conductor | 1-D graphene oxide |
| Combination 4 | 2-D conductor | 2-D graphene oxide |
| Combination 5 | 3-D conductor | 1-D graphene oxide |
| Combination 6 | 3-D conductor | 2-D graphene oxide |
| Combination 7 | 1-D conductor | 1-D graphene oxide + 2-D graphene oxide |
| Combination 8 | 1-D conductor | 1-D graphene oxide + 2-D graphene oxide |
| Combination 9 | 2-D conductor | 1-D graphene oxide + 2-D graphene oxide |
| Combination 10 | 2-D conductor | 1-D graphene oxide + 2-D graphene oxide |
| Combination 11 | 3-D conductor | 1-D graphene oxide + 2-D graphene oxide |
| Combination 12 | 3-D conductor | 1-D graphene oxide + 2-D graphene oxide |
| Combination 13 | 1-D conductor + 2-D conductor | 1-D graphene oxide |
| Combination 14 | 1-D conductor + 2-D conductor | 2-D graphene oxide |
| Combination 15 | 1-D conductor + 3-D conductor | 1-D graphene oxide |
| Combination 16 | 1-D conductor + 3-D conductor | 2-D graphene oxide |
| Combination 17 | 2-D conductor + 3-D conductor | 1-D graphene oxide |
| Combination 18 | 2-D conductor + 3-D conductor | 2-D graphene oxide |

Figure 2:
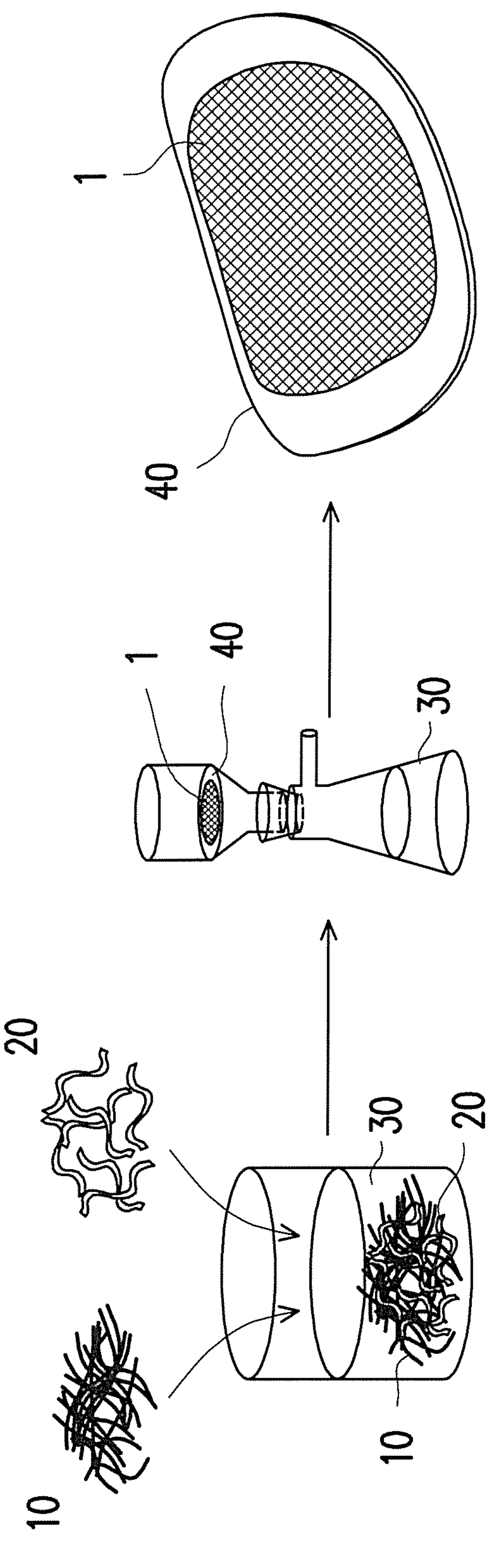
FIG. 2 is a schematic diagram of a method of preparing a composite carbon material according to an embodiment of the invention.
Figure 3A:
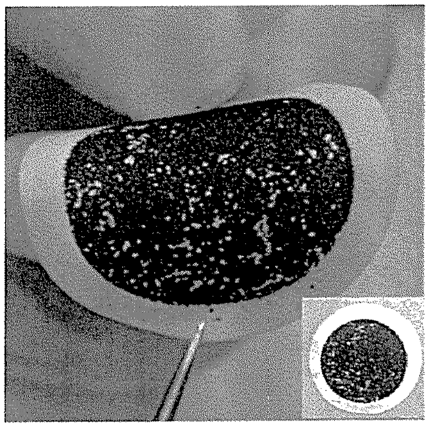
FIGS. 3(*a*), 3(*c*) and 3(*e*) are images of a conventional conductive thin film of Comparative Example 1, wherein the scale bar of FIG. 3(*c*) is 100 μm, and the scale bar of FIG. 3(*e*) is 500 μm.
Figure 3B:
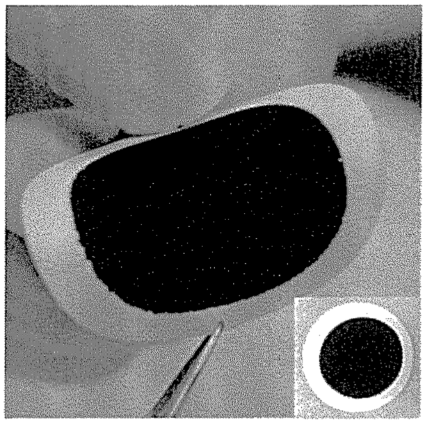
Figure 3C:
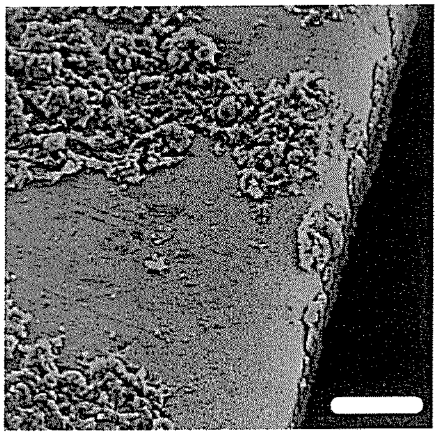
Figure 3D:
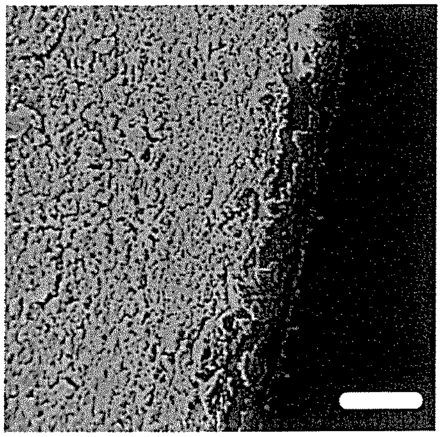
Figure 3E:
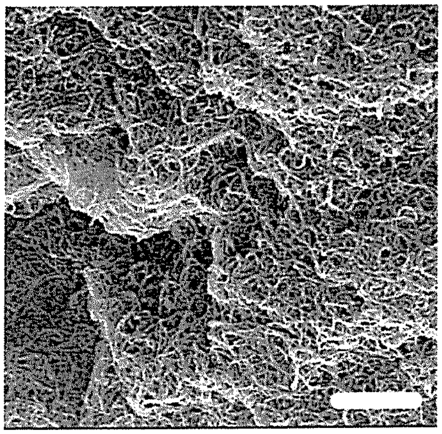
Figure 3F:
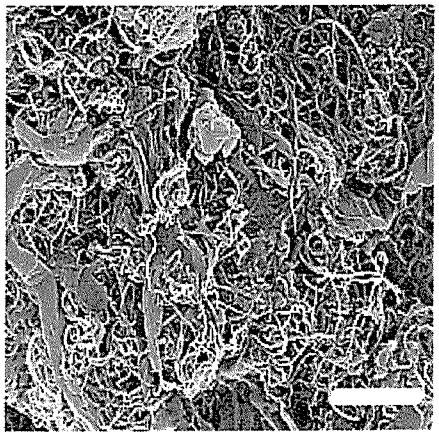

FIG. 2 is a schematic diagram of a method of preparing a composite carbon material according to an embodiment of the invention.

Referring to FIG. 2, a substrate 10 and a graphene oxide 20 are uniformly mixed in a solvent 30, wherein the graphene oxide 20 accounts for 5 wt % to 60 wt % based on the total weight of the substrate 10 and the graphene oxide 20. In an embodiment, the method of preparing the graphene oxide 20 includes embedding or inserting a nitrate, a sulfate, or a combination thereof between layers of a carbon material or between adjacent carbon materials, and then adding an oxidizing agent to oxidize the carbon material. The carbon material includes a single-walled carbon nanotube, a double-walled carbon nanotube, a multi-walled carbon nanotube, or a graphite, and the oxidizing agent includes potassium permanganate. In an embodiment, the solvent 30 can be deionized water. In another embodiment, the solvent 30 can be a suitable organic solvent, such as ethanol, acetone, N-methylpyrrolidone, the like, or a combination thereof. It is noted that, addition of a surfactant is not required in this mixing step, and thus, the electrical conductivity of the composite carbon material is not reduced due to addition of the surfactant.

Thereafter, the solvent 30 is removed. In an embodiment, a suction filtration is performed. In another embodiment, the step of removing the solvent 30 can be conducted by another suitable method as needed, such as a natural drying, a baking, or the like. The solvent 30 is removed from the mixture through a membrane filter 40. The remaining substrate 10 and graphene oxide 20 that are uniformly mixed together form a sheet-like composite carbon material 1 on the membrane filter 40. In an embodiment, the membrane filter 40 can be a polyvinylidene fluoride (PVDF) filter membrane.

Examples and Comparative Examples are provided below to verify the effects of the composite carbon material of the invention.

EXAMPLE 1

A multi-walled carbon nanotube (MWNT) having a one-dimensional conducting direction and a graphene oxide nanoribbon (GONR) having a one-dimensional conducting direction totaling 1 mg to 100 mg are uniformly dispersed in 1 ml to 50 ml of deionized water. Then, after removing the deionized water, the remaining MWNT and GONR that are uniformly mixed together forma sheet-like composite carbon material, which is used to prepare a conductive thin film of Example 1.

COMPARATIVE EXAMPLE 1

The sample of Comparative Example 1 is a conventional conductive thin film prepared with a pure multi-walled carbon nanotube.

FIGS. 3(*a*), 3(*c*) and 3(*e*) are images of the conventional conductive thin film of Comparative Example 1. FIGS. 3(*b*), 3(*d*) and 3(*f*) are images of the conductive thin film of Example 1 of the invention.

After the conventional conductive thin film is bent, as shown in FIG. 3(*a*), the surface thereof has many discontinued or defective regions. However, after the conductive thin film of the invention is bent, as shown in FIG. 3(*b*), the surface thereof is still very even and uniform without any defects or damages.

FIGS. 3(*c*) and 3(*e*) are scanning electron microscope (SEM) images of the conductive thin film prepared with the pure carbon nanotube. After the conventional conductive thin film is bent, many discontinued regions are produced, the film uniformity and flexibility are significantly reduced, and the electrical conductivity is significantly reduced.

In contrast, as shown in FIGS. 3(*d*) and 3(*f*), after the conductive thin film prepared with the composite carbon material of the invention is bent, the electrical conductivity remains excellent without generation of defects or damages. In addition, as show in FIG. 3(*f*), the tube-shape and ribbon-shape materials are uniformly mixed, indicating that the graphene oxide nanoribbon and the multi-walled carbon nanotube of the invention are uniformly dispersed.

Furthermore, an electrical conductivity test with an LED lamp is performed on the conventional conductive thin film of Comparative Example 1. When the thin film is not bent, the electrode is conducted and the LED lamp emits light, whereas when the thin film is bent, the electrode cannot be conducted and the LED lamp does not light up. However, when bent, the conductive thin film of Example 1 still enables the LED lamp to emit light, forming an electrical conduction path.

Figure 4A:
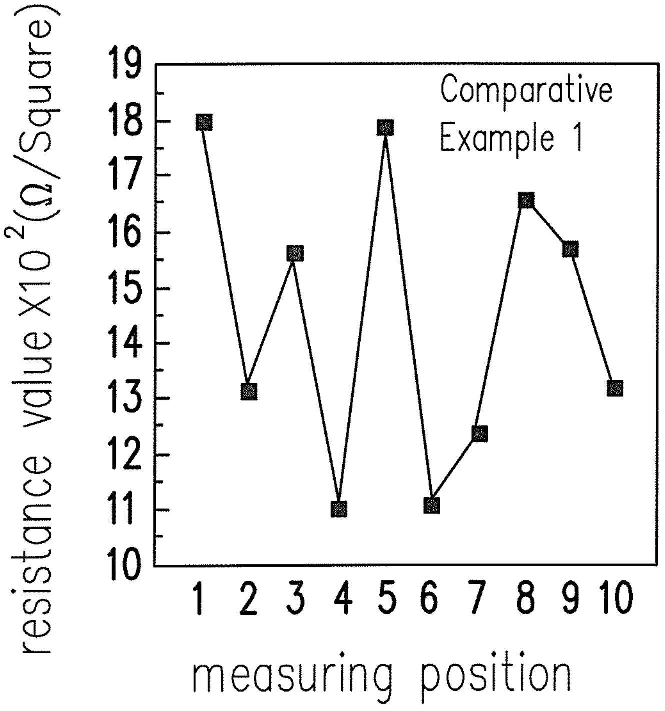
FIG. 4(*a*) is a resistance value distribution of a conventional conductive thin film of Comparative Example 1.
Figure 4B:
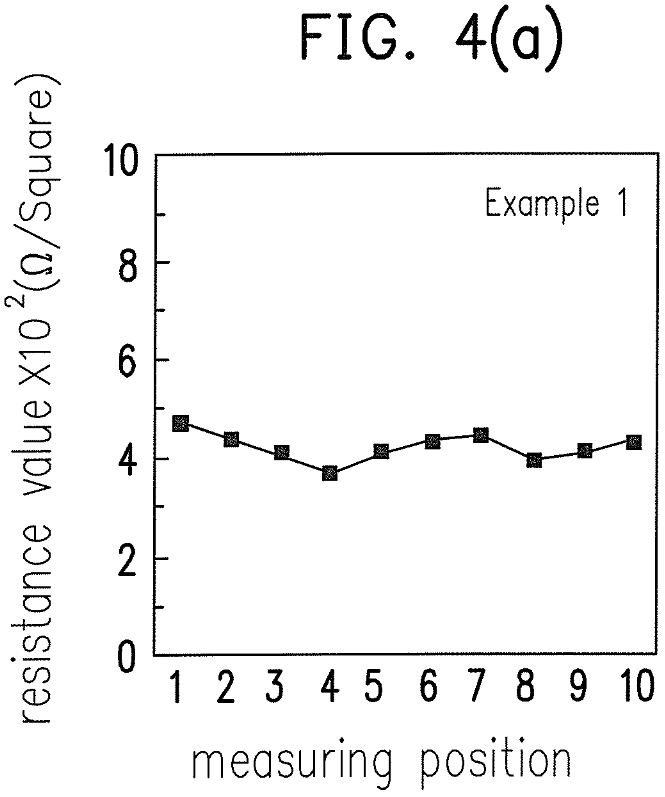

FIG. 4(*a*) is a resistance value distribution of the conventional conductive thin film of Comparative Example 1. FIG. 4(*b*) is a resistance value distribution of the conductive thin film of Example 1 of the invention.

Referring to FIG. 4(*a*), a four-point probe is used to perform a measurement of resistance value of the conventional conductive thin film. Due to defects or damages on the surface of the thin film, the resistance value distribution is uneven and the electrical conductivity is poor.

Referring to FIG. 4(*b*), a four-point probe is used to perform a measurement of resistance value of the conductive thin film of Example 1 of the invention. As shown in FIG. 4(*b*), the resistance value distribution is even and stable and the electrical conductivity is excellent.

EXAMPLE 2

A multi-walled carbon nanotube having a one-dimensional conducting direction and a graphene oxide nanoribbon (GONR) having a one-dimensional conducting direction are mixed in different proportions to prepare a plurality of composite carbon materials. A sheet resistance test is then performed on the prepared composite carbon materials.

Figure 5:
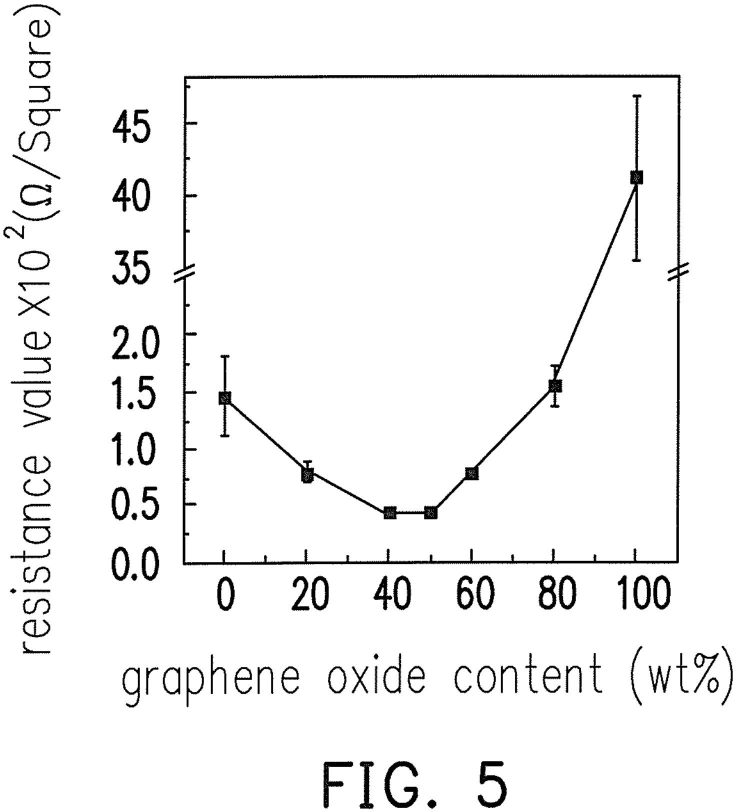
FIG. 5 is a graph illustrating a relationship between a resistance value and a graphene oxide content in a composite carbon material of Example 2 of the invention.

FIG. 5 is a graph illustrating a relationship between a resistance value and a graphene oxide content in a composite carbon material of Example 2 of the invention.

As shown in FIG. 5, the composite carbon materials having different electrical conductive properties can be prepared by tuning or adjusting the content of the graphene oxide. Such composite carbon materials having different electrical conductive properties can be widely applied to different products. In an embodiment, a low resistance property is desired when the composite carbon material of the invention is applied to a conductive thin film. In such case, the graphene oxide content is preferably within a range of 20 wt % to 60 wt % to achieve the optimal electrical conductive property.

EXAMPLE 3

A single-walled carbon nanotube having a one-dimensional conducting direction and a graphene oxide nanoribbon (GONR) having a one-dimensional conducting direction are mixed in different proportions to prepare a plurality of composite carbon materials. A sheet resistance test is then performed on the prepared composite carbon materials.

Figure 6:
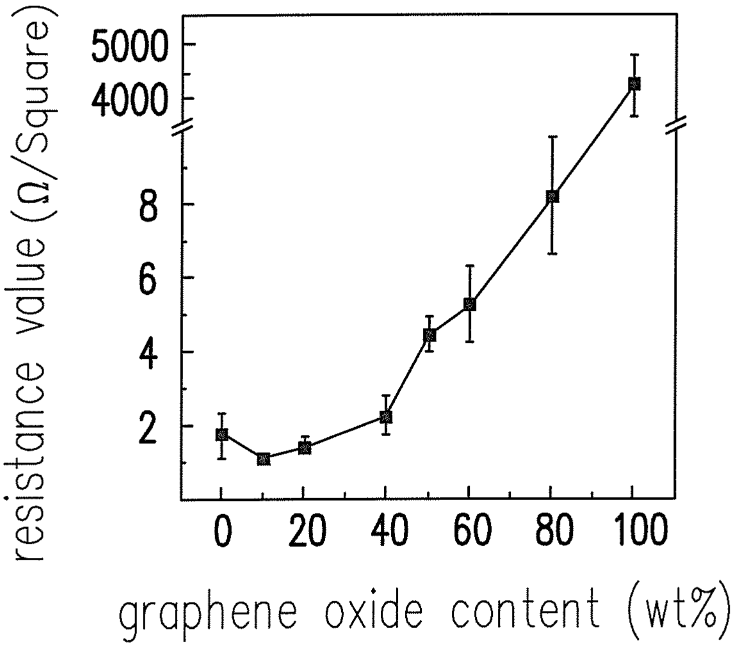
FIG. 6 is a graph illustrating a relationship between a resistance value and a graphene oxide content in a composite carbon material of Example 3 of the invention.

FIG. 6 is a graph illustrating a relationship between a resistance value and a graphene oxide content in a composite carbon material of Example 3 of the invention. As shown in FIG. 6, the graphene oxide content is preferably within a range of 10 wt % to 20 wt % to achieve the optimal electrical conductive property. Based on the results of FIGS. 5 and 6, the graphene oxide of the invention not only enables the multi-walled carbon nanotube to be uniformly dispersed, but also enables the single-walled carbon nanotube to be uniformly dispersed.

EXAMPLE 4

A graphene having a two-dimensional conducting direction and a graphene oxide nanoribbon (GONR) having a one-dimensional conducting direction are mixed in different proportions to prepare a plurality of composite carbon materials. A sheet resistance test is then performed on the prepared composite carbon materials.

Figure 7:
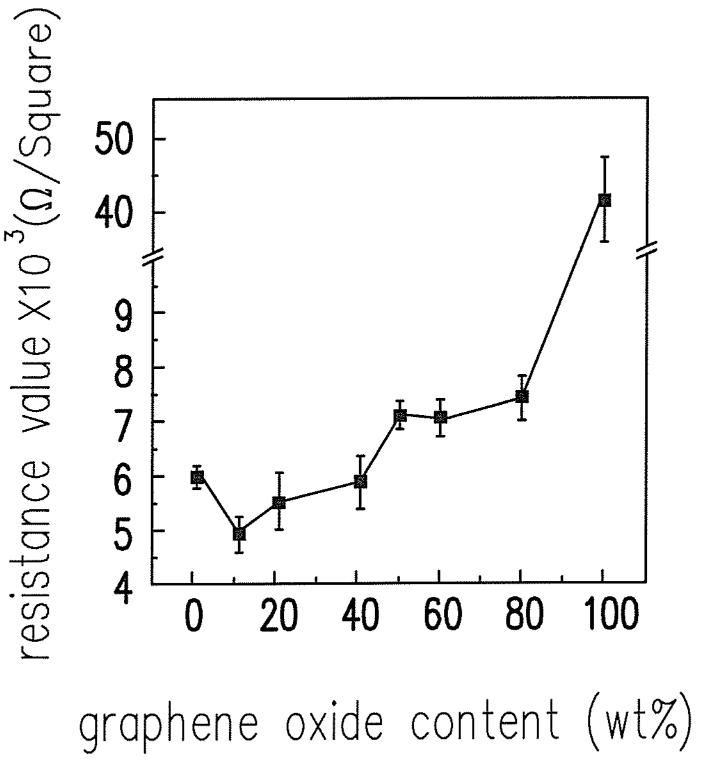
FIG. 7 is a graph illustrating a relationship between a resistance value and a graphene oxide content in a composite carbon material of Example 4 of the invention.

FIG. 7 is a graph illustrating a relationship between a resistance value and a graphene oxide content in a composite carbon material of Example 4 of the invention. As shown in FIG. 7, the graphene oxide content is preferably within a range of 10 wt % to 20 wt % to achieve the optimal electrical conductive property.

In view of the above, the invention can manufacture composite carbon materials having different electrical conductive properties by changing the type of the substrate, the content of the substrate, the conducting dimension of the substrate and/or the content of the graphene oxide, etc. It is appreciated by people having ordinary skill in the art that the conducting dimension of the graphene oxide can also be adjusted, and the invention is not limited to the examples above.

In summary, in the invention, a graphene oxide is mixed with a substrate (for example, a carbon-containing substrate) to form a composite carbon material. The oxygen-containing functional groups of the graphene oxide are beneficial to increase the dispersity property, so the graphene oxide and the substrate cab be uniformly dispersed in ordinary water. Furthermore, the graphene oxide itself has electrical conductivity and can be used without requiring further purification. In addition, the electrical conductivity of the composite carbon material with the graphene oxide added is better than that of the original carbon-containing substrate. In other words, the graphene oxide of the invention can replace the existing non-conductive surfactant that is used to uniformly disperse the carbon substrate. By such manner, the subsequent complicated process of purification treatment is eliminated, and the conductive graphene oxide itself enables the electrical conductivity of the composite carbon material to be more excellent.

Although the invention has been described with reference to the above embodiments, it will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A composite carbon material, comprising:

a carbon-containing substrate comprises single-walled carbon nanotubes; and graphene oxide nanoribbons having an oxygen content of 5-40 at % based on a total number of atoms of carbon and oxygen, wherein the graphene oxide nanoribbons accounts for 10-20 wt % based on a total weight of the carbon-containing substrate and the graphene oxide nanoribbons.

2. The composite carbon material according to claim 1, wherein the carbon-containing substrate comprises a doping element, wherein the doping element comprises sulfur, phosphorus, boron, nitrogen or a combination thereof.

3. The composite carbon material according to claim 2, wherein the carbon-containing substrate is the single-walled carbon nanotubes.

4. The composite carbon material according to claim 1, wherein the carbon-containing substrate is the single-walled carbon nanotubes.

* * * * *